(12) United States Patent  
Minami et al.

(10) Patent No.: US 7,720,979 B2  
(45) Date of Patent: May 18, 2010

(54) COMMUNICATION APPARATUS (75) Inventors: Toshiaki Minami, Yokohama (JP);  
Daisuke Shiraishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 11/952,217

(22) Filed: Dec. 7, 2007

(65) Prior Publication Data  
US 2008/0141009 A1 Jun. 12, 2008

(30) Foreign Application Priority Data  
Dec. 12, 2006 (JP) ............................. 2006-334787

(51) Int. Cl.  
*G06F 15/16* (2006.01)

(52) U.S. Cl. .................. 709/228; 709/227; 711/100

(58) Field of Classification Search ............... 709/227, 709/228; 710/5, 20, 36; 711/100  
See application file for complete search history.

(56) References Cited

U.S. PATENT DOCUMENTS

| | | | | | |
|---|---|---|---|---|---|
| 4,908,823 | A | * | 3/1990 | Haagens et al. ............. | 370/464 |
| 5,537,417 | A | * | 7/1996 | Sharma et al. ............. | 709/228 |
| 6,671,767 | B2 | * | 12/2003 | Furuumi et al. ............. | 711/100 |
| 7,117,276 | B2 | * | 10/2006 | Maeda et al. ................ | 710/36 |
| 2003/0229715 | A1 | * | 12/2003 | Baratakke et al. ........... | 709/245 |
| 2006/0047863 | A1 | * | 3/2006 | Awakura ...................... | 710/20 |

FOREIGN PATENT DOCUMENTS

| | | |
|---|---|---|
| JP | 11-313126 | 11/1999 |
| WO | WO 00/13091 | 3/2000 |

* cited by examiner

*Primary Examiner*—Saleh Najjar  
*Assistant Examiner*—Marie Georges Henry  
(74) *Attorney, Agent, or Firm*—Canon U.S.A., Inc. I.P. Division

(57) ABSTRACT

A processor transfers control information set for each connection from a second memory to a first memory, and updates the control information stored in the first memory in accordance with processing of the connection. The processor selects control information updated in the first memory, and transfers the selected control information from the first memory to the second memory.

4 Claims, 8 Drawing Sheets

```
struct tcpcb {
    struct      segrsq      t_seqq;                /* segment reassembly queue */
    int         t_segglen;                         /* segment reassembly queue length */
    int         t_dupacks;                         /* consecutive dup acks recd */ short       t_timer[TCP_NTIMERS];              /* TCP timer */ int         t_state;                           /* send of this connection */
    u_int       t_flags;

tcp_seq     snd_una;                           /* send unacknowledged */
    tcp_seq     snd_max;                           /* highest sequence number sents */
    tcp_seq     snd_nxt;                           /* send next */
    tcp_seq     snd_up;                            /* send urgent pointer */ tcp_seq     snd_wl1;                           /* window update seg seq number */
    tcp_seq     snd_wl2;                           /* window update seg ack number */
    tcp_seq     iss;                               /* initial send sequence number */
    tcp_seq     irs;                               /* initial receive sequence number */ tcp_seq     rcv_nxt;                           /* receive next */
    tcp_seq     rcv_adv;                           /* advertised window */
    u_long      rcv_wnd;                           /* receive window */
    tcp_seq     rcv_up;                            /* receive urgent pointer */ u_long      snd_wnd;                           /* send window */
    u_long      snd_cwnd;                          /* congestion-controlled window */
    u_long      snd_ssthresh;                      /* snd_cwnd size threshold for slow start */
    tcp_seq     snd_recover;                       /* for use in Fast Recovery */
};
```

COMMUNICATION APPARATUS

BACKGROUND OF THE INVENTION

1. Field of the Invention

The present invention relates to a communication apparatus for processing a connection.

2. Description of the Related Art

Along with the prevalence of Gigabit Ethernet(R) and the like, not only general-purpose PCs but also embedded devices are required to execute network protocol processing at high speed.

In order to achieve the Full-wire speed of Gigabit Ethernet (R), a processor with an operating frequency of about 3 GHz is required. Such operating frequency is far beyond the performances of processors normally equipped in embedded devices. Hence, it is becoming increasingly popular to realize broadband network communications by adding, to a system, an auxiliary device such as a TOE (TCP/IP Offload Engine) specialized to protocol processing. An example of the prior art of the TOE is disclosed in WO0013091.

PCB handling is important in TCP protocol processing. A PCB is an abbreviation for a protocol control block. The PCB is context information configured by several ten types of parameters (variables) prepared for each TCP connection, and which PCB information is to be used must be looked up and determined every time a TCP packet is received.

Elements of each PCB are variables which are frequently accessed during TCP processing, i.e., keystone variables in the TCP processing. Upon speeding up of TCP, speeding up of PCB lookups and accesses is indispensable.

In the invention disclosed in WO0013091, a high access speed is realized by copying and holding a PCB required to execute the TCP protocol processing from a main memory to a high-speed temporary memory such as an SRAM or the like. At this time, when the number of connections increases, and all PCBs cannot fall within the temporary memory, replacement processing is executed between the temporary memory and main memory so that temporary memory holds only required PCBs.

As described above, by storing and processing PCBs in a high-speed temporary memory, protocol stack processing can be speeded up. However, in consideration of the processing performance, the influence of the replacement processing of the PCBs in the temporary memory must be taken into consideration. The replacement of PCBs in the temporary memory frequently occurs when the capacity of the temporary memory is smaller than the number of connections. This problem is serious in a system of embedded devices since the capacity of the temporary memory cannot be increased in terms of cost.

Upon replacing PCBs in the temporary memory, one of PCBs stored in the temporary memory is selected, is written back to the main memory, and a newly required PCB is then read out. Since the data size of a PCB is as large as a hundred and several ten bytes, a time period required for the temporary memory replacement imposes a serious influence on the system performance. Hence, it is demanded to shorten this time period.

SUMMARY OF THE INVENTION

It is an object of the present invention to efficiently process connections.

It is another object of the present invention to efficiently process data received in an order different from that they are transmitted.

It is still another object of the present invention to provide a communication apparatus comprising: a first storage unit; and a processing unit configured to process a connection, wherein the processing unit transfers control information set for each connection from a second storage unit to the first storage unit, the processing unit updates control information stored in the first storage unit in accordance with the processing of the connection, the processing unit selects control information updated in the first storage unit, and the processing unit transfers the selected control information from the first storage unit to the second storage unit.

It is yet another object of the present invention to provide a communication apparatus comprising: a first storage unit configured to store one of first control information and second control information; and a processing unit configured to process a connection, wherein the processing unit updates one of the first control information and the second control information stored in the first storage unit, the processing unit replaces the first control information stored in the first storage unit and the second control information stored in a second storage unit so that the first storage unit stores the second control information, and the second storage unit stores both the first control information and the second control information, and the processing unit stores, in the first storage unit, information required to reorder data received in an order different from a transmission order to have the transmission order.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings.

First Embodiment

The first embodiment of the present invention will be described first.

Figure 1:
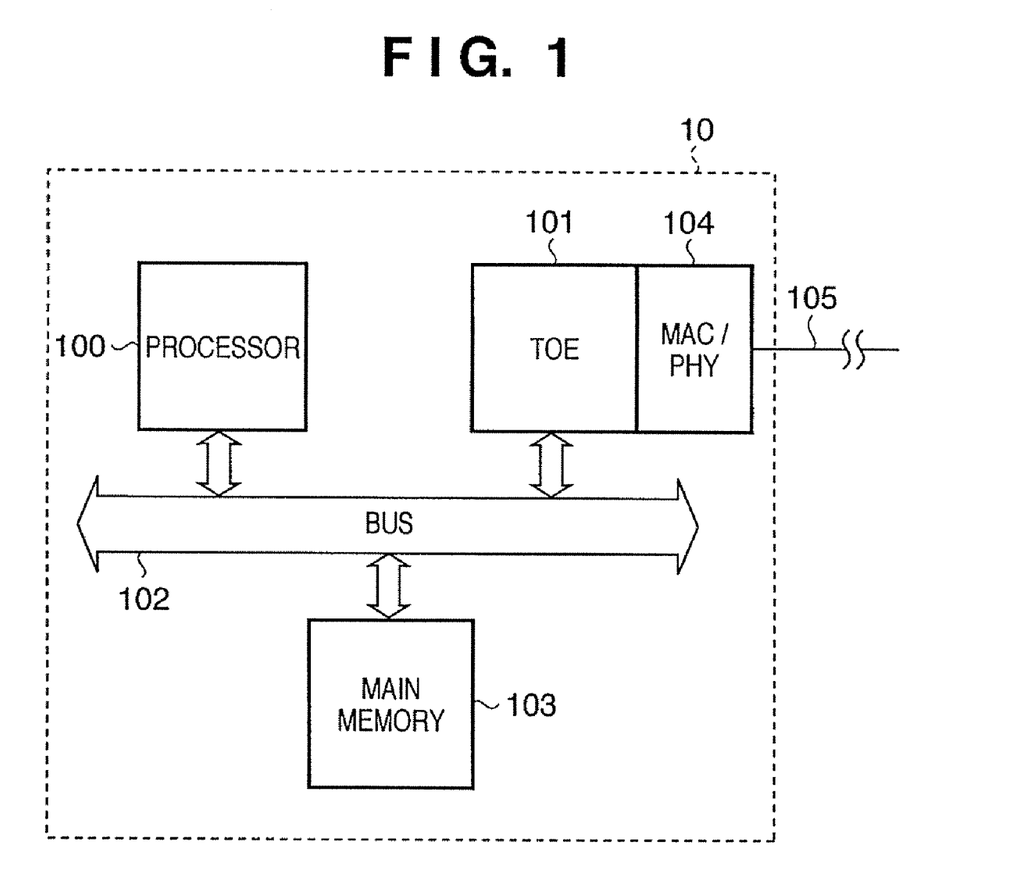
FIG. 1 is a block diagram showing the arrangement of a protocol processing apparatus according to one embodiment of the present invention.

FIG. 1 is a block diagram showing the arrangement of a protocol processing apparatus 10 according to the first embodiment of the present invention. Referring to FIG. 1, reference numeral 100 denotes a processor which executes general software such as applications, an OS, device drivers, and the like. Reference numeral 101 denotes a TOE (communication apparatus) which offloads TCP protocol processing from the processor 100. Reference numeral 102 denotes a bus, which connects the processor 100, the TOE 101, and a main memory 103.

The main memory 103 stores data used by the TOE 101, a work area for the TOE 101, a communication area for the processor 100 and TOE 101, and the like, in addition to programs to be executed by the processor 100 and its work area.

Reference numeral 104 denotes a MAC (data link layer) and PHY (physical layer) of Ethernet(R), which are controlled from the TOE 101, and exchange information with the TOE 101 using Ethernet(R) frame units. Reference numeral 105 denotes Ethernet(R), which allows connections of another network device and the MAC/PHY 104 via a switch, hub, router, and the like (none of them are shown).

Figure 2:
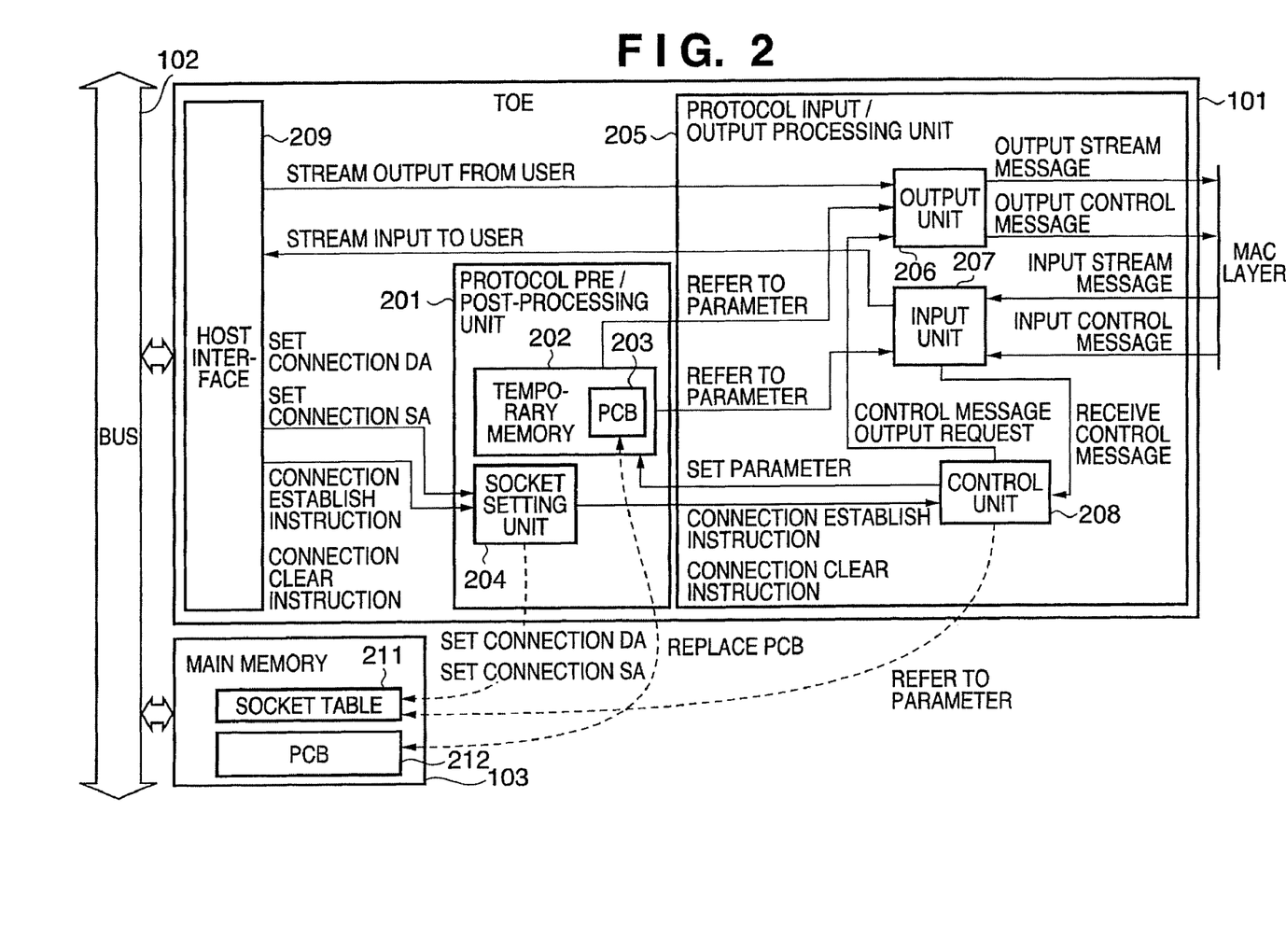
FIG. 2 is a block diagram showing the arrangement of a TOE and main memory in detail.

FIG. 2 is a block diagram showing the arrangement of the TOE 101 and main memory 103. As shown in FIG. 2, the TOE 101 comprises a protocol pre/post-processing unit 201, protocol input/output processing unit 205, and host interface 209.

In the protocol pre/post-processing unit 201, reference numeral 202 denotes a temporary memory. A PCB (Protocol Control Block) is information (protocol control information) required to control protocol processing, and includes an INPCB and TCPCB in practice. In the temporary memory 202, reference numeral 203 denotes a PCB storage area, which is an area on the memory used to hold a plurality of PCB sets. The PCB sets held on the PCB storage area 203 are a partial set of PCBs held on a PCB storage area 212 in the main memory 103. Note that the protocol input/output processing unit 205 can access the temporary memory 202 at high speed. The INPCB is an abbreviation for an Internet Protocol Control Block. The TCPCB is an abbreviation for a TCP Protocol Control Block.

Reference numeral 204 denotes a socket setting unit. Reference numerals 206 and 207 respectively denote an output unit and an input unit, which input/output a stream message and control message with the MAC layer.

Reference numeral 208 denotes a control unit, which executes protocol control according to the contents of the PCBs stored in the PCB storage area 203, and updates the PCBs in the PCB storage area 203.

Reference numeral 209 denotes a host interface which controls communications with the processor 100 (FIG. 1) connected to the bus 102.

In the main memory 103, reference numeral 211 denotes a socket table, which holds socket information for each connection. Reference numeral 212 denotes a PCB storage area, which holds all PCB sets available at that time, which include PCB sets held in the PCB storage area 203 in the temporary memory 202.

Note that FIG. 2 does not illustrate any arrangement corresponding to the processor 100, MAC/PHY 104, and Ethernet(R) 105 shown in FIG. 1, for the sake of simplicity.

Figure 3:
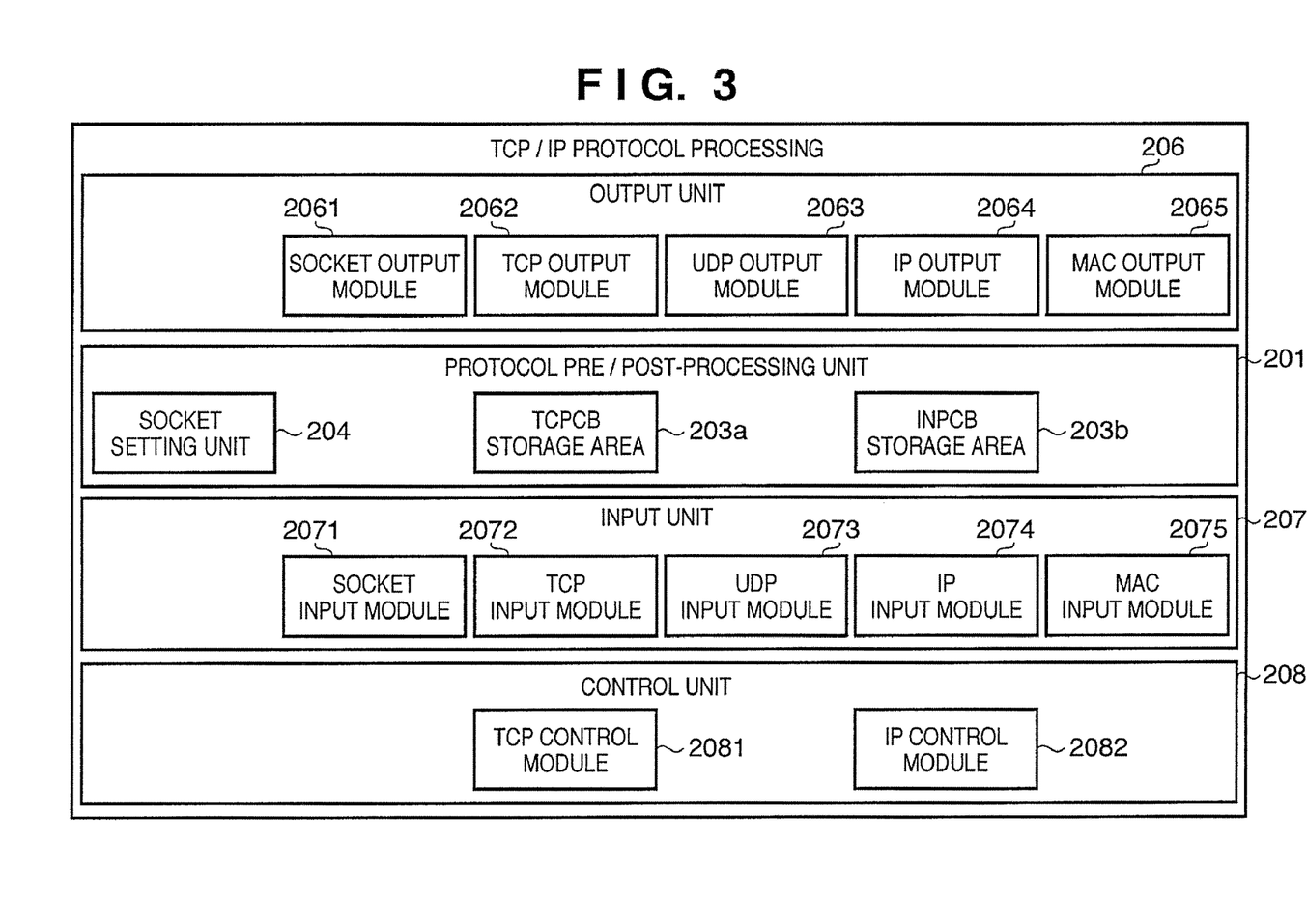
FIG. 3 is a block diagram showing the detailed arrangement of an output unit, protocol pre/post-processing unit, input unit, and control unit shown in FIG. 2.

FIG. 3 is a block diagram showing the functional arrangement of the output unit 206, protocol pre/post-processing unit 201, input unit 207, and control unit 208 shown in FIG. 2.

The output unit 206 comprises a socket output module 2061, TCP output module 2062, UDP output module 2063, IP output module 2064, and MAC output module 2065.

The socket output module 2061 outputs a stream output from a user device (application) to an appropriate communication channel.

When the socket of the stream output from the user device is a TCP socket, the TCP output module 2062 appends a TCP header to the stream output from the user, and outputs that stream output to the IP output module 2064 as a lower layer as a segment.

When the socket of the stream output from the user device is a UDP socket, the UDP output module 2063 appends a UDP header to the stream output, and outputs that stream output to the IP output module 2064 as a lower layer as a datagram.

The IP output module 2064 receives the segment and datagram from a transport layer (TCP output module 2062 and UDP output module 2063) to form an IP packet, and appends an IP header to it.

The MAC output module 2065 appends a MAC header to an IP packet from the IP output module 2064 as an IP layer, and outputs that packet to an interface (MAC) as a frame.

The input unit 207 comprises a socket input module 2071, TCP input module 2072, UDP input module 2073, IP input module 2074, and MAC input module 2075.

The MAC input module 2075 verifies the validity of an MAC header of a frame received from the interface (MAC), and removes the MAC header.

The IP input module 2074 verifies the validity of an IP packet received from the MAC input module 2075. If necessary, the IP input module 2074 reconstructs an IP fragment, and shapes the IP packet to a format that can be interpreted by a layer higher than the transport layer. The module 2074 then removes an IP header, and outputs a payload of that IP packet to an appropriate transport (UDP or TCP) layer.

The UDP input module 2073 verifies the validity of a header of a UDP datagram received from the IP input module 2074, removes a UDP header, and outputs a payload of the datagram to the socket input module 2071.

The TCP input module 2072 verifies the validity of a header of a TCP segment received from the IP input module 2074, removes a TCP header, and outputs a payload of the segment to the socket input module 2071 as a stream.

The socket input module 2071 determines a stream or datagram received from the transport layer input module (UDP input module 2073 or TCP input module 2072) based on its communication channel (socket), and outputs it to an appropriate user device (application).

The control unit 208 comprises a TCP control module 2081 and IP control module 2082. The TCP control module 2081 executes TCP status control and the like for each socket based on reception of a flag segment detected by the TCP input module 2072, an internal timer event, and a connection establish/clear instruction from the socket setting unit 204. The TCP control module 2081 instructs the TCP output module 2062 to output a segment.

The IP control module 2082 processes a request to determine whether or not to receive a reception IP packet based on an IP packet reception event from the IP input module 2074, and a routing inquiry request upon outputting a stream from the IP output module 2064.

The protocol pre/post-processing unit 201 comprises the socket setting unit 204, a TCPCB storage area 203*a*, and an INPCB storage area 203*b*.

The socket setting unit 204 receives an SA (source address)/DA (destination address) setting and a connection establish/clear instruction from a user device, assures, updates, or clears the socket table 211, and requests the protocol input/output processing unit 205 to output a frame upon establishment/clear of a connection.

The socket table 211 shown in FIG. 2 holds, for each of a plurality of communication channels (sockets), its SAAddr/DAAddr/SAPort/DAPort, communication parameters, a protocol to be handled, reference information to PCBs associated with that protocol, and a protocol type (UDP/TCP etc.) of the transport layer. Note that the SAAddr/DAAddr/SAPort/DAPort is an abbreviation for SourceAddress/DestinationAddress/SourcePort/DestinationPort: SAAddr is a source IP address; DAAddr, a destination IP address; SAPort, a source port number; and DAPort, a destination port number.

Strictly speaking, the SAAddr/DAAddr/SAPort/DAPort is saved in the INPCB storage area 203b. In this case, the socket table 211 holds reference information indicating an INPCB record that the socket of interest is to refer to.

The TCPCB storage area 203a saves a TCP connection status and required parameters for each communication channel (socket) so as to control TCP. The INPCB storage area 203b saves a SAAddr/DAAddr/SAPort/DAPort, TTL (Time To Live: a packet valid period)/TOS (Type Of Service), options, and the like for each communication channel (socket) so as to control IP.

Note that the PCB storage area 203 in FIG. 2 corresponds to the TCPCB storage area 203a and INPCB storage area 203b shown in FIG. 3.

The protocol pre/post-processing unit 201 and protocol input/output processing unit 205 will be described below with reference to FIG. 2 under the assumption that they include the functional blocks shown in FIG. 3.

(1) Upon reception of a TCP stream communication request from a user application program which runs on the processor 100, an OS which runs on the processor 100 requests, via the bus 102, the TOE 101 to set a connection DA (destination address) and connection SA (source address) before and after a stream input/output.

The protocol pre/post-processing unit 201 in the TOE 101 receives this request, and the socket setting unit 204 in the protocol pre/post-processing unit 201 processes that request. The socket setting unit 204 determines that settings associated with the connection DA and connection SA are to be saved in the socket table 211, and makes settings associated with the connection DA and connection SA in the socket table 211. At this time, new PCBs corresponding to this connection are generated in the PCB storage area 212 in the main memory to initialize the PCBs.

The user application on the processor 100 issues a connection establish instruction. In the TOE 101, the socket setting unit 204 in the protocol pre/post-processing unit 201 also receives this instruction, and determines its processing. In this case, the socket setting unit 204 copies a relevant PCB from the PCB storage area 212 in the main memory 103 to the PCB storage area 203 in the temporary memory 202. At this time, if the PCB storage area 203 has no free space, the socket setting unit 204 selects one PCB which is least likely to be used (for example, which is not used for a longest period of time) from the PCB storage area 203, and writes it back to the PCB storage area 212 prior to the copy.

The socket setting unit 204 issues a control frame send instruction resulting from the connection establish instruction to the protocol input/output processing unit 205. In the protocol input/output processing unit 205, the control unit 208 processes this connection establish instruction.

The control unit 208 decides what kinds of control frames are to be sent in connection establishment, checks a change in protocol status as a result of sending that control frame, and sets them in the PCB storage area 203 as parameters. More specifically, in case of TCP, the control unit 208 sets a decision result of sending a SYN segment and a change in status variable due to status transition as a result of sending the SYN segment in the TCPCB storage area 203a.

The control unit 208 decides a control frame to be sent and sets the socket table 211 and the PCB storage areas 212 and 203 upon connection establishment, but the output unit 206 performs an actual frame sending task.

If the control unit 208 decides that sending a control frame is necessary, it sends a control message output request to the output unit 206. The output unit 206 sends a control frame required for connection establishment in an interval upon sending (other) streams.

(2) The user application or an OS kernel on the processor 100 can output a stream if the SA/DA settings and connection establish instruction are complete. A stream output instruction is directly received by the output unit 206 in the protocol input/output processing unit 205 in the TOE 101. Inside the output unit 206, the stream output instruction is processed by the socket output module 2061, TCP output module 2062 or UDP output module 2063, IP output module 2064, and MAC output module 2065. In this case, an actual frame is generated and output with reference to the PCB storage area 203 if necessary.

In this case, as a result of reference to the socket table 211, the control unit 208 determines a required PCB. The control unit 208 refers to the PCB storage area 203 to check if a relevant PCB is available. If such PCB is not available, the control unit 208 copies the relevant PCB from the PCB storage area 212 in the main memory 103 to the PCB storage area 203 in the temporary memory 202. At this time, if the PCB storage area 203 has no free space, the control unit 208 selects one PCB which is least likely to be used (for example, which is not used for a longest period of time) from the PCB storage area 203, and writes it back to the PCB storage area 212 prior to the copy.

(3) Upon reception of a stream frame from the MAC layer, the input unit 207 receives that frame. In the input unit 207, the MAC input module 2075, IP input module 2074, UDP input module 2073 or TCP input module 2072, and socket input module 2071 process that received stream frame, and input the stream to the OS kernel or user application on the processor 100. At this time, in order to particularly determine a communication channel (socket) to which that stream belongs, the socket table 211 and PCB storage area 203 must be referred to.

As a result of reference to the socket table 211, the control unit 208 determines a required PCB. The control unit 208 refers to the PCB storage area 203 to check if a relevant PCB is available. If such PCB is not available, the control unit 208 copies the relevant PCB from the PCB storage area 212 in the main memory 103 to the PCB storage area 203 in the temporary memory 202. At this time, if the PCB storage area 203 has no free space, the control unit 208 selects one PCB which is least likely to be used (for example, which is not used for a longest period of time) from the PCB storage area 203, and writes it back to the PCB storage area 212 prior to the copy.

During the stream input/output, a frame required for protocol control is likely to be received from the MAC layer. Upon reception of this frame, the input unit 207 executes only its header interpretation, and the control unit 208 executes actual processing for the protocol control. For this reason, upon reception of a protocol control related frame, the input unit 207 sends information indicating that a control message is received, its type, and required data obtained as a result of interpretation to the control unit 208. The control unit 208 may access the PCB storage area 203 to have this control message reception event as a trigger, and may request the output unit 206 to output a control message for the protocol control again.

Upon completion of the stream input/output by the user application on the processor 100, the user application issues a connection clear instruction. The sequence of the basic processing for that instruction is the same as that for the instruction to establish a connection.

As described above, in cases of (1) connection establishment, (2) stream output, and (3) stream input, a PCB set held on the PCB storage area 203 may be replaced by that held on the PCB storage area 212. At this time, a PCB set held on the PCB storage area 203 must be written back to the main memory 103 first. In this embodiment, only changed PCBs are written back without writing back all PCBs for every processing.

More specifically, taking, as an example, data (INPCB) stored in the INPCB storage area 203b, the INPCB data include the destination IP address, destination port number, source IP address, and source port number, but they are invariable values for one connection and need not be written back. On the other hand, the INPCB data also include parameters such as IP options, flags, and the like, which are likely to change during a communication, in addition to the aforementioned values, and they are to be written back.

Figure 4:
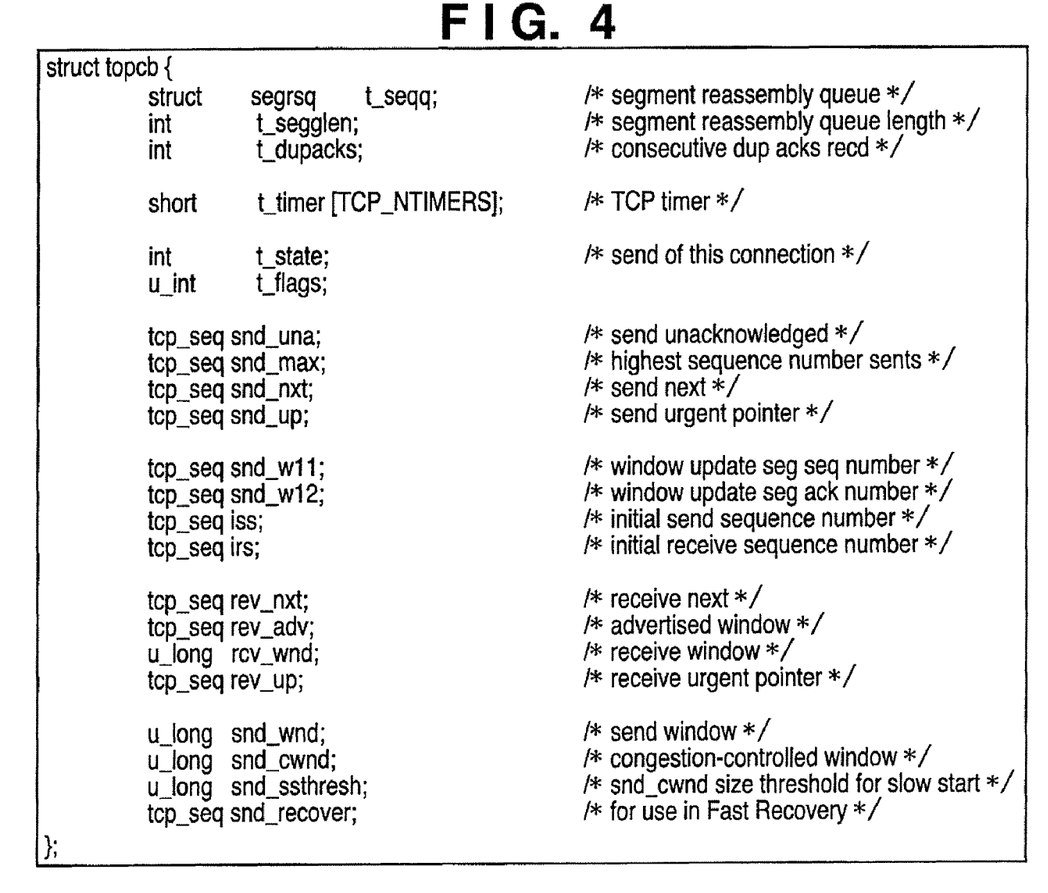
FIG. 4 is a view showing an excerpt from TCPCB data.

Data (TCPCB) stored in the TCPCB storage area 203a are roughly classified into send parameters and receive parameters. FIG. 4 shows an excerpt from TCPCB data. In FIG. 4, parameters starting with a prefix "snd_" are send parameters, and those starting with "rcv_" are receive parameters. The TCPCB data also depend on implementation, and can be separated into invariable parameters and variable parameters for each connection. For example, in FIG. 4, a pointer t_segq to a reassemble queue can be implemented to be invariable.

As described above, parameters in PCB data are classified to those which are invariable for each connection, and those which are updated during a communication.

Figure 5:
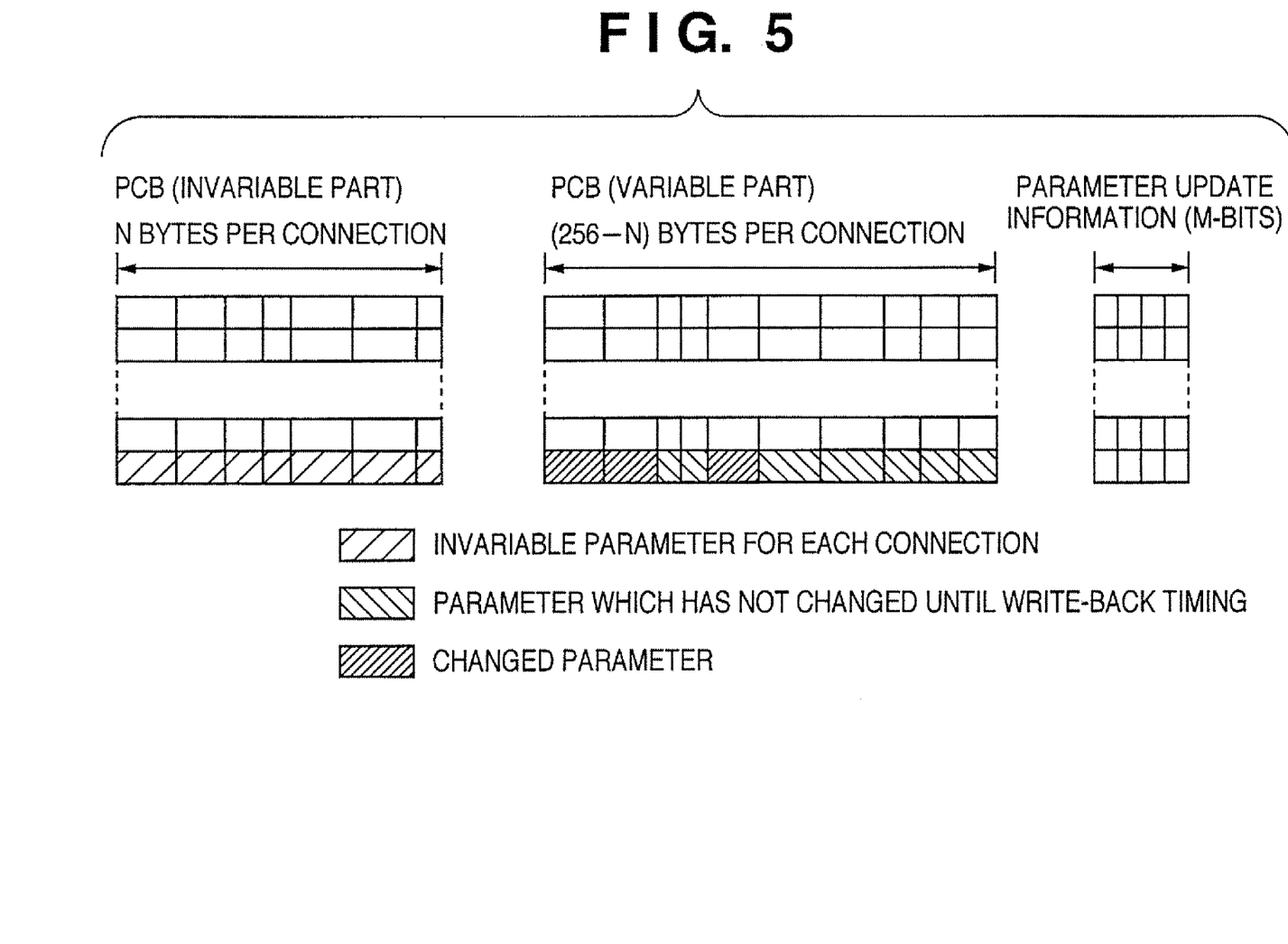
FIG. 5 shows an example of the data structure of a PCB used to manage invariable and update parameters.

In this embodiment, the PCB data are classified and managed, as described above. FIG. 5 illustrates the PCB storage state in the PCB storage area 203 in the temporary memory 202.

As shown in FIG. 5, the PCB storage area 203 stores PCB data corresponding to respective connections, and respective PCB data are classified into a parameter part (invariable part) which is invariable during the TCP protocol processing, and a parameter part (variable part) to be changed during the processing.

FIG. 5 distinctively illustrates an invariable parameter for each connection, a parameter which has not changed until the write-back timing to the main memory 103 (a parameter which is likely to change but has not changed in practice), and a parameter which changed at the write-back timing to the main memory 103 for each PCB.

In FIG. 5, M-bit parameter update information is appended to each PCB in correspondence with M parameters which are likely to change. When an arbitrary PCB set is copied from the PCB storage area 212 to the PCB storage area 203, the parameter update information of that PCB set is cleared. After that, when the control unit 208 updates an arbitrary parameter held in the PCB storage area 203, it sets an update information bit of the parameter update information corresponding to that parameter. This update information bit is a value which can be set for a parameter of PCB data that is likely to change, and can indicate the updated parameter. After that, when one of events (1), (2), and (3) above has occurs, and that PCB data is written back to the PCB storage area 212, only the actually updated parameter is selected and written back with reference to the update information bit of the PCB data.

As described above, according to this embodiment, only a change part is written back from the temporary memory 202 to the main memory 103. Therefore, the data size upon replacing PCB data stored in the temporary memory 202 and those stored in the main memory 103 can be reduced, and the time period required for temporary memory replacement can be shortened. As a result, the protocol processing performance can be improved.

Also, the bus and memory bandwidth required for write in the main memory 103 can be reduced, and can be distributed to other devices in the system, thus improving the processing performance of the entire system and reducing the power consumption of the system.

The aforementioned embodiment has been explained as an application example of the present invention, and various modifications can be made without departing from the scope of the invention.

For example, the aforementioned embodiment has exemplified the case wherein update information bits are assigned to respective PCB parameters. However, the present invention is not limited to this. For example, parameters may be combined into some groups to fit the bus transfer size and main memory access size, and update information bits may be assigned to respective groups. In this case, it is preferable to selectively group parameters which are more likely to change.

Second Embodiment

The second embodiment of the present invention will be described below. Since the arrangement of the protocol processing apparatus according to this embodiment is the same as that shown in FIGS. 1 to 3, a description thereof will not be repeated. Assume that the protocol processing apparatus according to this embodiment comprises the functions of the protocol processing apparatus according to the first embodiment described above.

Figure 6:
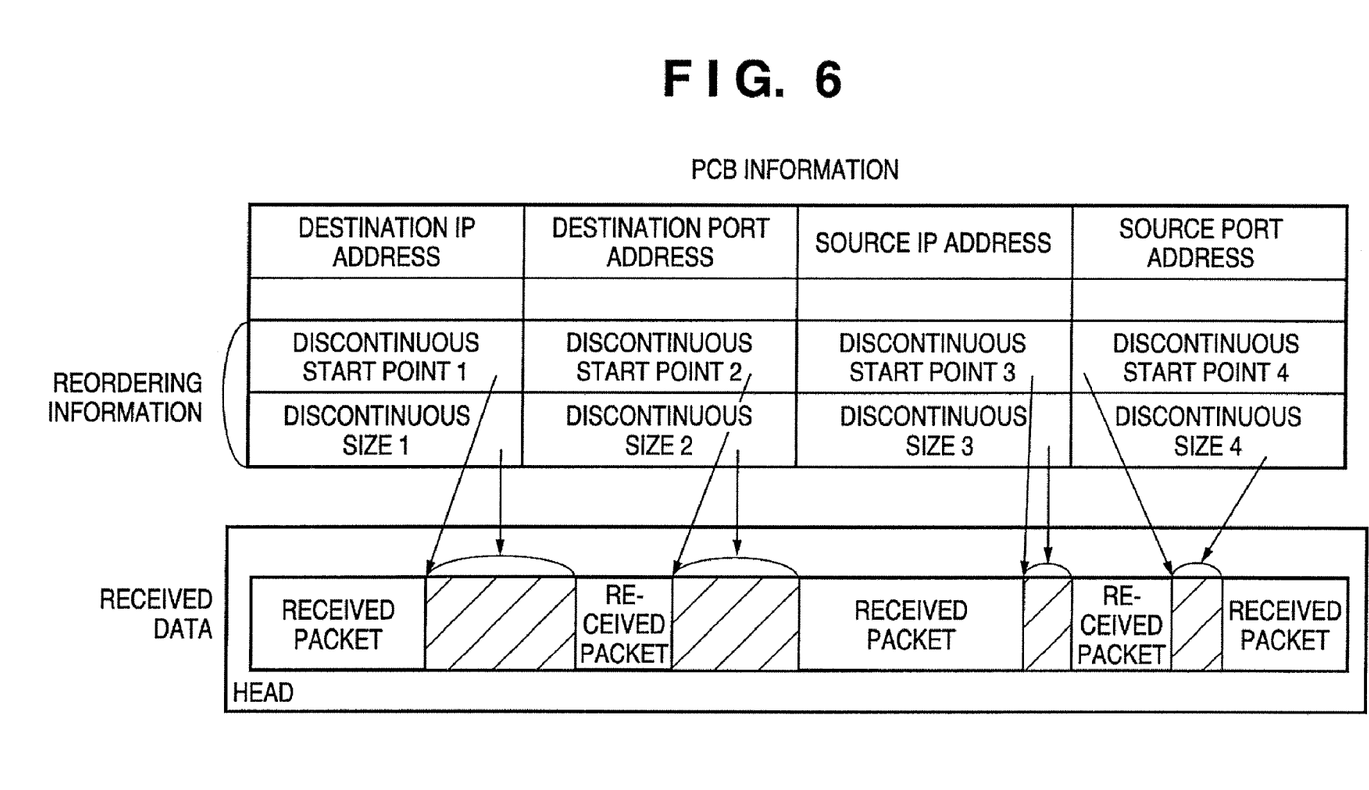
FIG. 6 shows the relationship between the data structure of a PCB including reordering information and received data.

PCB data held in the PCB storage area 203 in the temporary memory 202 and those held in the PCB storage area 212 in the main memory 210 are provided with reordering information, as shown in FIG. 6. That is, PCB data of this embodiment include reordering information in addition to the destination IP address, destination port number, source IP address, source port number, and the like. This reordering information is a parameter part to be changed (variable part) in FIG. 5.

In the TCP protocol processing, the reordering information is to be accessed in addition to the aforementioned parameters. Reordering means processing for reordering packets, which are received in no particular order, to the order of a transmission stream.

In the TCP protocol processing, packets sent from a source may reach a destination via different routes. Since network conditions are different for respective routes, some packets may require considerably long time periods between their transmission and reception timings, and some other parts may reach the destination in the order they are sent. Hence, the destination must reorder received packets in the order the source sent them. In this case, the reordering information is used by the destination to reorder the received packets, and manages a discontinuous part of received packets using a pointer or the like.

The reordering information includes n pieces of discontinuous information ($0 \leq n \leq$ a predetermined value where n is a natural number). In this embodiment, a maximum of four pieces of discontinuous information are allowed to be held per PCB in terms of the limitation on the capacity of the PCB storage area 203. The discontinuous information includes a position where a packet received by the TCP input module 2072 becomes discontinuous (discontinuous start point and a size up to the head position of the next received packet (discontinuous size). Note that the position in this case means, e.g., a storage position of a buffer memory in the TCP input module 2072 which temporarily stores received data.

Upon reception of discontinuous data, the TCP input module 2072 in the input unit 207 registers discontinuous information in reordering information of PCB data held in the PCB storage area 203.

Data received by the TCP input module 2072 are transferred in given units to the socket input module 2071 in the order they are sent from the source. That is, the TCP input module 2072 reorders the transfer order of packets to have the order the packets are sent from the source in accordance with the sequence numbers (information indicating the transmission order of the source) of received packets, and then transfers the packets to the socket input module 2071.

Figure 7A:
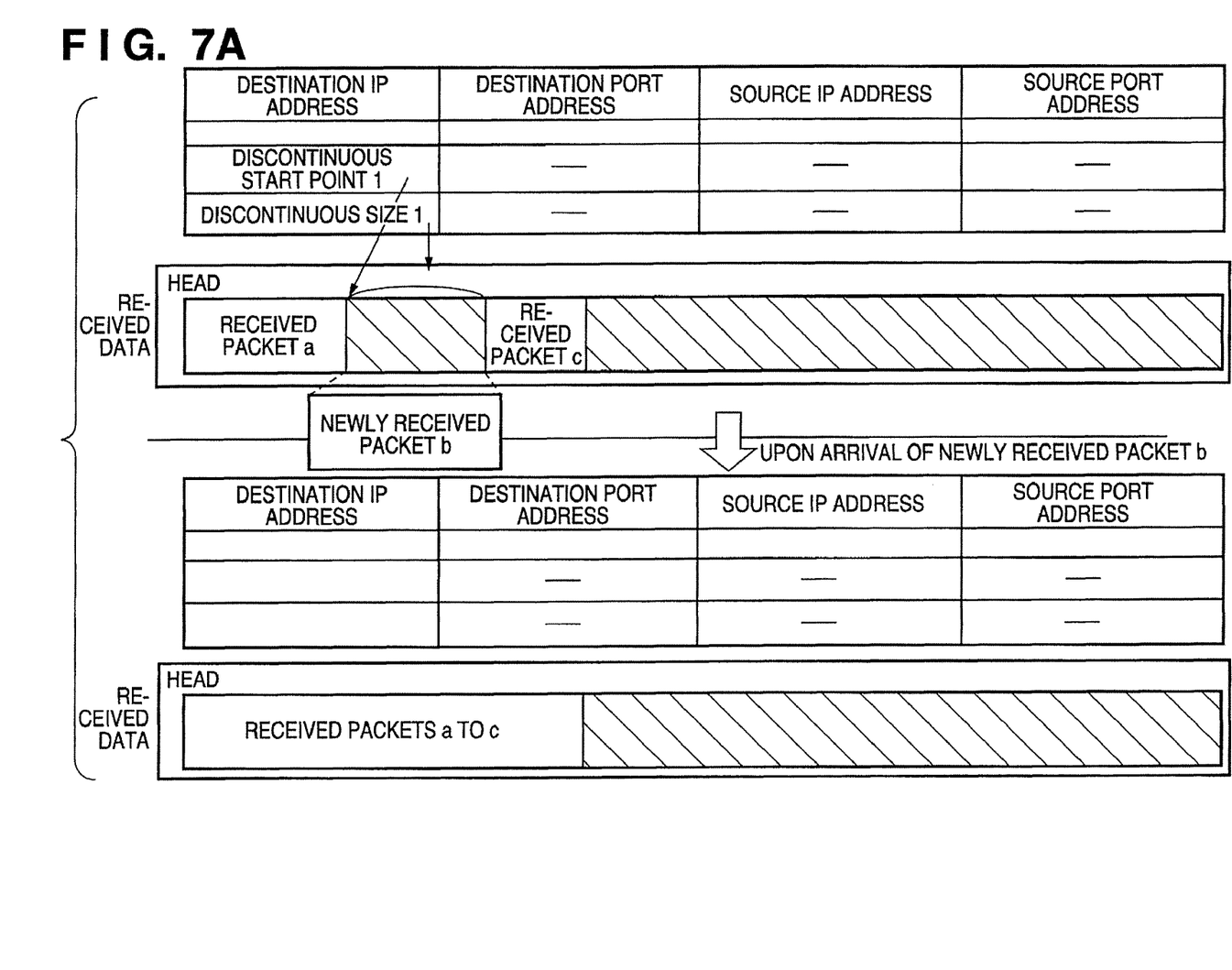
FIGS. 7A and 7B show the relationship between the data structure of a PCB including reordering information and received data.

For example, as shown in FIG. 7A, upon reception of packet b while packets a and b has already been received, the TCP input module 2072 determines the insertion position of packet b based on the sequence numbers of packets a to c upon transferring packet b.

The example shown in FIG. 7A is premised on that the transmission order of the source indicated by the sequence numbers is an order of packet a, packet b, and packet c. Therefore, the TCP input module 2072 inserts packet b between packets a and c, and transfers these packets. At this time, packet b is inserted at a position between packets a and c with reference to discontinuous information (discontinuous start point 1 and discontinuous size 1). In the example of FIG. 7A, packets a to c can be continuously transferred by inserting packet b between packets a and c. In this case, the TCP input module 2072 deletes the discontinuous information (discontinuous start point 1 and discontinuous size 1) from the PCB storage area 203.

Figure 7B:
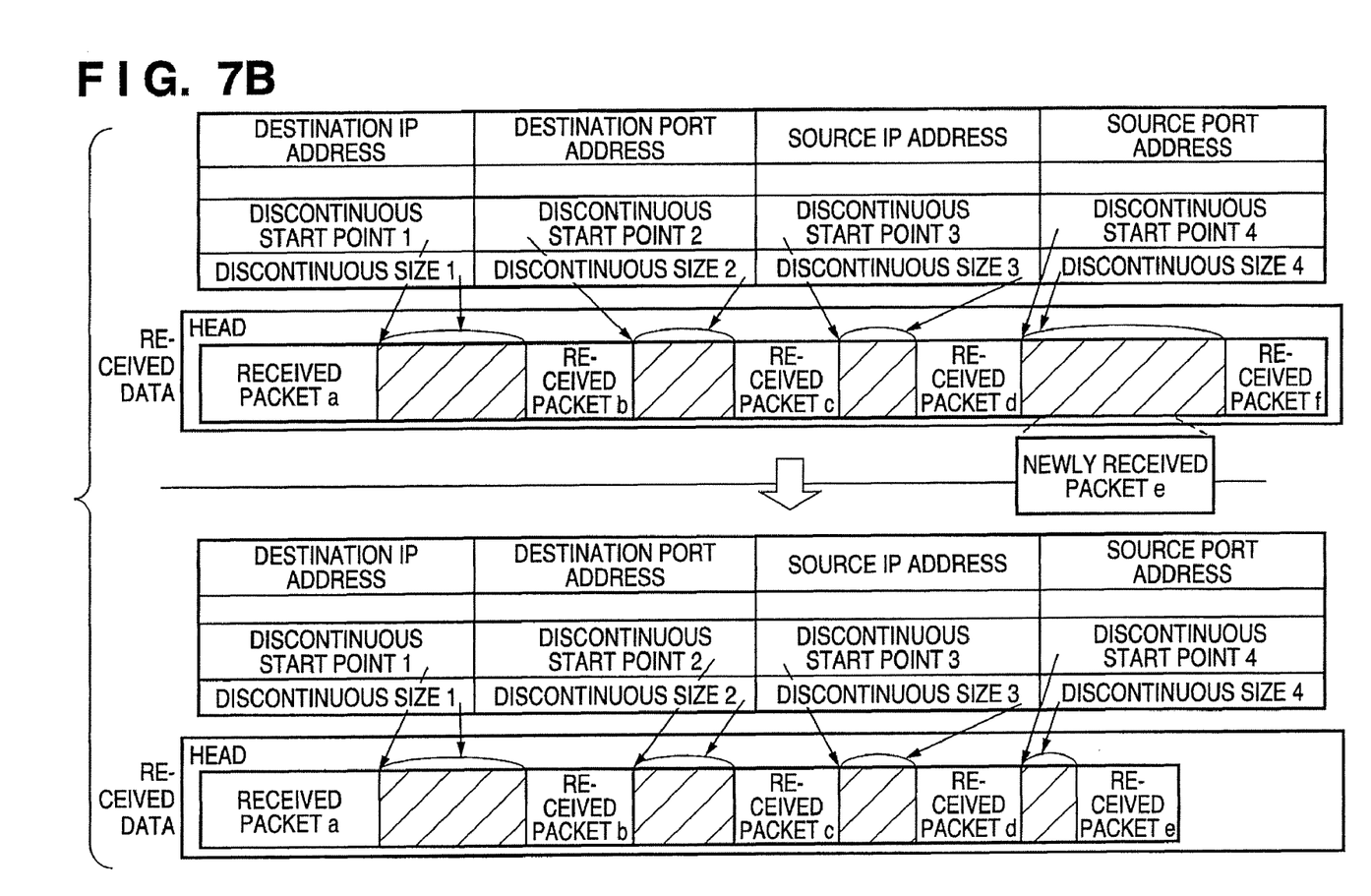

Also, as shown in FIG. 7B, upon reception of new packet e while packets a to d and packet f have already been received, the TCP input module 2072 determines the insertion position of packet e based on the sequence numbers of packets a to f upon transferring packet e.

The example shown in FIG. 7B is premised on that the transmission order of the source indicated by the sequence numbers is an order of packet a, packet b, packet c, packet d, packet e, and packet f. Therefore, the TCP input module 2072 inserts packet e between packets d and f. However, there are unreceived packets between packets d and e and between packets e and f.

In this embodiment, a maximum of four pieces of discontinuous information can only be set per PCB in terms of the limitation on the memory capacity of the PCB storage area 203. Hence, the TCP input module 2072 selects discontinuous information indicating a discontinuous start point of a packet located at a temporally rearmost position of those corresponding to five pieces of discontinuous information as a result of reordering of the packets. That is, the module 2072 selects discontinuous information corresponding to packet f which was sent last from the source.

The TCP input module 2072 deletes the selected discontinuous information from the reordering information. Also, the module 2072 deletes packet f located behind the discontinuous start point indicated by the discontinuous information to be deleted.

As described above, according to this embodiment, since PCB data includes reordering data, accesses to reordering information by the TOE 101 (TCP input module 2072) can be speeded up while keeping the restraint based on the capacity limitation of the temporary memory 202. In this way, the reordering processing time period of received data in the TCP reception processing can be shortened, and the protocol stack processing can consequently be speeded up.

According to this embodiment, since reordering information need not be managed independently of PCB data, no dedicated mechanism for managing the reordering information is required, thus reducing the implementation scale.

The aforementioned embodiment has been explained as an application example of the present invention, and various modifications can be made without departing from the scope of the invention.

For example, in the aforementioned embodiment, the maximum number of pieces of discontinuous information included in the reordering information is four. However, the present invention is not limited to this. The maximum number of pieces of discontinuous information may be determined based on the capacity and cost of the temporary memory 202. In this embodiment, when the number of pieces of discontinuous information becomes larger than a predetermined value, discontinuous information that exceeds the value and corresponding received data are deleted. In another embodiment, discontinuous information indicating a discontinuous start point farthest from the head of data is selected, and the selected discontinuous information is stored in another recording medium such as the main memory 103 or the like.

The objects of the present invention are also achieved by supplying a storage medium, which records a program code of software that can implement the functions of the above-mentioned embodiments to a system or apparatus, and reading out and executing the program code stored in the storage medium by a computer of the system or the like.

In this case, the program code itself read out from the storage medium implements the functions of the aforementioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile memory card, ROM, and the like may be used.

The scope of the present invention also includes a case wherein the functions of the above-mentioned embodiments are implemented by some or all actual processes executed by an OS or the like, which runs on the computer, based on the instruction of the program code read out by the computer.

Furthermore, the scope of the present invention includes a case wherein the functions of the above-mentioned embodiments are implemented when the program code read out from the storage medium is written in a memory equipped on a function expansion unit connected to the computer, and a CPU or the like executes actual processes based on the instruction of that program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-334787, filed on Dec. 12, 2006, which is hereby incorporated by reference herein in its entirety.

What is claimed is:

1. A communication apparatus that processes a connection, the apparatus comprising:
    a first storage unit configured to store a plurality of protocol control blocks;
    a second storage unit configured to temporarily store a protocol control block;
    a transfer unit configured to transfer a protocol control block stored in the first storage unit, corresponding to a predetermined connection to the second storage unit, where the protocol control block has updating information corresponding to M parameters respectively; and an updating unit configured to update the updating information of the protocol control block, among protocol control blocks stored in the second storage unit, corresponding to the undated parameters, wherein, when a protocol control block having been stored in the second storage unit is written back to the first storage unit to allocate a space in the second storage unit for storing another protocol control block into the second storage unit from the first storage unit, the transfer unit selects a parameter updated by the updating unit, and writes back the selected parameter from the second storage unit to the first storage unit.

2. The apparatus according to claim 1, where, when a connection is set, the protocol control block corresponding to the connection is generated in said first storage unit.

3. The apparatus according to claim 1, wherein when the communication apparatus receives a frame from a MAC layer, the communication apparatus refers to the first storage unit to determine the protocol control block to be used, and transfers the protocol control block to be used from the first storage unit to the second storage unit.

4. The apparatus according to claim 1, wherein the protocol control block comprises information required to reorder data received in an order different from a transmission order to have the transmission order.

* * * * *